US010428264B2

United States Patent
Chopade et al.

(10) Patent No.: US 10,428,264 B2
(45) Date of Patent: Oct. 1, 2019

(54) BREAKER COATED PARTICULATES FOR USE IN SUBTERRANEAN FORMATION OPERATIONS

(71) Applicant: HALLIBURTON ENERGY SERVICES, INC., Houston, TX (US)

(72) Inventors: Prashant D. Chopade, Kingwood, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 247 days.

(21) Appl. No.: 15/525,940

(22) PCT Filed: Dec. 12, 2014

(86) PCT No.: PCT/US2014/069909
§ 371 (c)(1),
(2) Date: May 10, 2017

(87) PCT Pub. No.: WO2016/093851
PCT Pub. Date: Jun. 16, 2016

(65) Prior Publication Data
US 2017/0313931 A1 Nov. 2, 2017

(51) Int. Cl.
*E21B 43/04* (2006.01)
*E21B 43/267* (2006.01)
*C09K 8/68* (2006.01)
*C09K 8/70* (2006.01)
*C09K 8/80* (2006.01)
(Continued)

(52) U.S. Cl.
CPC ............ *C09K 8/706* (2013.01); *C09K 8/68* (2013.01); *C09K 8/805* (2013.01); *C09K 8/88* (2013.01); *E21B 43/04* (2013.01); *E21B 43/26* (2013.01); *E21B 43/267* (2013.01); *C09K 2208/24* (2013.01); *C09K 2208/26* (2013.01)

(58) Field of Classification Search
CPC . C09K 8/68; C09K 8/035; C09K 8/52; C09K 2208/26; C09K 8/80; E21B 43/26; E21B 43/267; E21B 43/04; E21B 21/062; E21B 41/0064; E21B 43/006; E21B 43/025; E21B 43/166
See application file for complete search history.

(56) References Cited

U.S. PATENT DOCUMENTS 6,311,773 B1 11/2001 Todd et al.
7,350,571 B2 4/2008 Nguyen et al.
7,484,564 B2 2/2009 Welton et al.
(Continued)

OTHER PUBLICATIONS

International Search Report and Written Opinion from International Application No. PCT/US2014/069909, dated Aug. 28, 2015.

*Primary Examiner* — Zakiya W Bates
(74) *Attorney, Agent, or Firm* — McGuireWoods LLP

(57) ABSTRACT

Methods of preparing a viscosified treatment fluid comprising a base fluid, a gelling agent, and breaker coated particulates ("BCPs"). The BCPs comprise particulates at least partially coated with a first layer of a stabilization agent followed by a second layer of a breaker. The viscosified treatment fluid may be introduced into a subterranean formation, the breaker activated to reduce a viscosity thereof, and a particulate pack formed in the subterranean formation with the BCPs.

20 Claims, 1 Drawing Sheet

(51) Int. Cl.
*C09K 8/88* (2006.01)
*E21B 43/26* (2006.01)

(56) References Cited

U.S. PATENT DOCUMENTS

| | | |
|---|---|---|
| 7,721,804 B2 | 5/2010 | Duenckel |
| 8,579,028 B2 | 11/2013 | Nguyen et al. |
| 8,590,621 B2 | 11/2013 | Lord et al. |
| 8,689,872 B2 | 4/2014 | Welton et al. |
| 2004/0000402 A1* | 1/2004 | Nguyen .................. C09K 8/68 166/280.1 |
| 2005/0261138 A1 | 11/2005 | Robb et al. |
| 2005/0277554 A1 | 12/2005 | Blauch et al. |
| 2008/0190609 A1 | 8/2008 | Robb et al. |
| 2009/0221453 A1 | 9/2009 | Mukhopadhyay et al. |
| 2013/0213657 A1 | 8/2013 | Dobson, Jr. et al. |

* cited by examiner

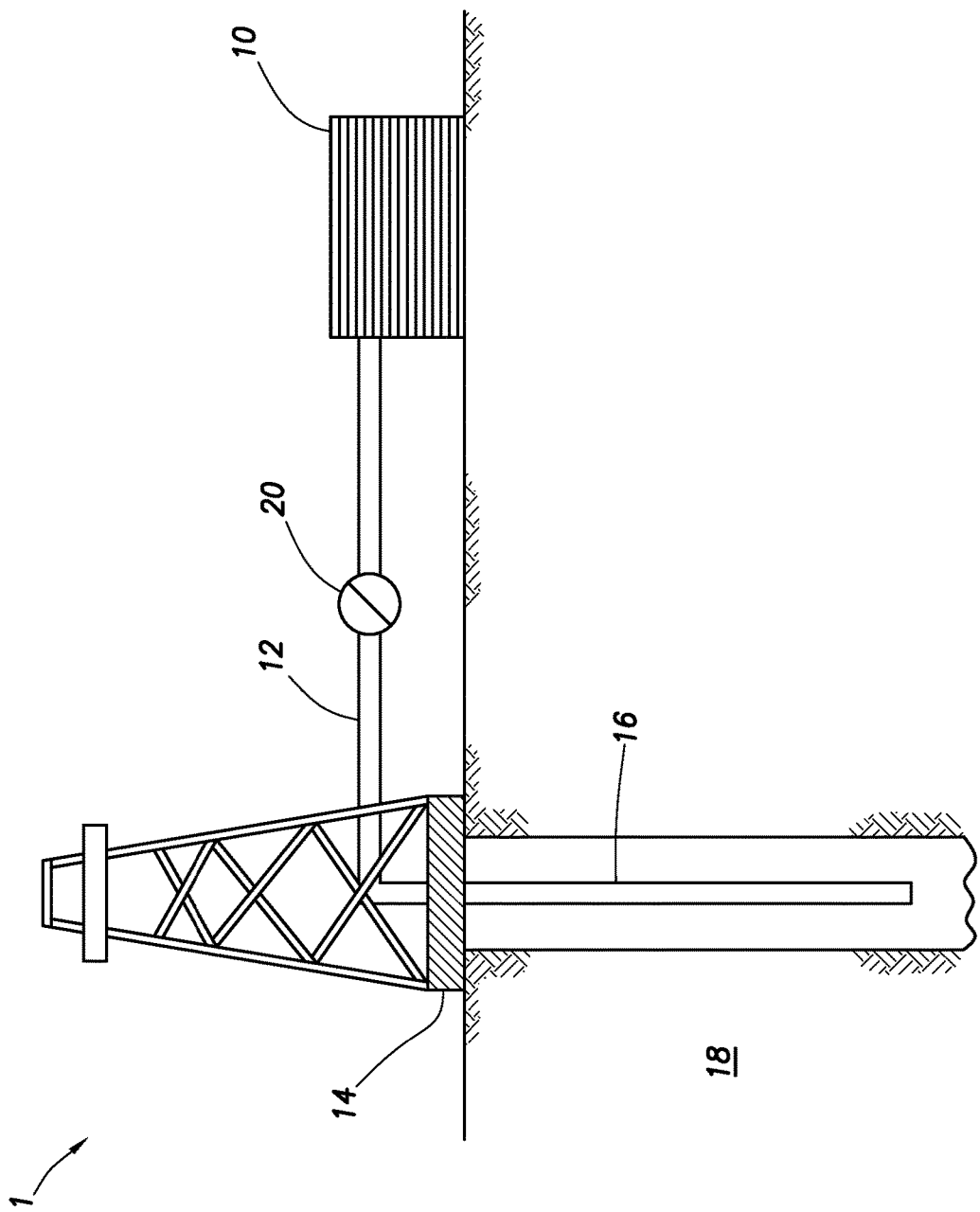

BREAKER COATED PARTICULATES FOR USE IN SUBTERRANEAN FORMATION OPERATIONS

BACKGROUND

The embodiments herein relate generally to subterranean formation operations and, more particularly, to breaker coated particulates.

Subterranean formation operations often involve drilling a wellbore in a subterranean formation with a drilling fluid and thereafter optionally placing a cement sheath between the formation and a casing (or liner string) in the wellbore. The cement sheath is formed by pumping a cement slurry through the bottom of the casing and out through an annulus between the outer casing wall and the formation face of the wellbore. The cement slurry then cures in the annular space, thereby forming a sheath of hardened cement that, inter alia, supports and positions the casing in the wellbore and bonds the exterior surface of the casing to the subterranean formation.

After a wellbore has been drilled and optionally a cement sheath formed therein, the subterranean wellbore may be stimulated by hydraulic fracturing treatments. In hydraulic fracturing treatments, a treatment fluid is pumped into a portion of a subterranean formation at a rate and pressure such that the subterranean formation breaks down and one or more fractures are formed. Typically, particulate solids are then deposited in the fractures. These particulate solids, or "proppant particulates" or "proppant," serve to prevent the fractures from fully closing once the hydraulic pressure is removed by forming a proppant pack. As used herein, the term "proppant pack" refers to a collection of proppant particulates in a fracture. By keeping the fracture from fully closing, the proppant particulates aid in forming conductive paths through which fluids may flow.

Hydraulic fracturing treatments may also be combined with sand control treatments, such as a gravel packing treatment. Such treatments may be referred to as "frac-packing" treatments. In a typical frac-packing treatment, a viscous treatment fluid comprising a plurality of particulates is pumped through an annulus between a wellbore tubular mounted with a screen and the wellbore in a subterranean formation. The fluid may be pumped into perforations through a casing, or directly into the wellbore in the case of open hole completions at a rate and pressure sufficient to create or enhance at least one fracture, and the particulates are deposited in the fracture and in the annulus between the screen and the wellbore. The particulates form a "gravel pack," and aid in propping open the fracture, as well as controlling the migration of formation fines or other loose particles in the formation from being produced with produced fluids. As used herein, unless specified otherwise, the term "particulate pack" will be used to refer to both proppant packs and gravel packs.

The drilling fluid and treatment fluids used to fracture the subterranean formation and/or place proppant or gravel particulates therein (collectively referred to as "treatment fluids") are typically viscosified. Viscosified treatment fluids generally have a viscosity that is sufficiently high, for example, to prevent undesired leak-off of fluids into a subterranean formation, to transfer hydraulic pressure, to suspend a variety of particulates for a desired period of time (e.g., proppant particulates), and the like. Generally, such viscosified treatment fluids comprise a gelling agent that may be crosslinked with crosslinking agents to achieve the desired viscosity.

The amount of gelling agent required to adequately viscosify a treatment fluid may be rather large, particularly given that gelling agents may degrade under the high temperature and high pressure environments often found in subterranean formations. Accordingly, additional amounts of the gelling agent may be required to compensate for such degradation, leading to increased cost associated with subterranean formation operations requiring use of the viscosified treatment fluids. Additionally, high amounts of gelling agent may generate increased "residue" in a subterranean formation or on a particulate, such as those forming a particulate pack, where the gelling agent remains attached thereto, causing, for example, a reduction in conductivity of fractures in the formation, thereby lowering the hydrocarbon production. Moreover, the high amounts of gelling agent required for forming adequate viscosified treatment fluids may further lead to increased costs associated with increased loading of crosslinking agents necessary to crosslink the gelling agents and breakers necessary to reduce the viscosity of the viscosified treatment fluid after an operation is complete so that it can be removed from the subterranean formation.

BRIEF DESCRIPTION OF THE DRAWING

The following FIGURE is included to illustrate certain aspects of the embodiments described herein, and should not be viewed as an exclusive embodiment. The subject matter disclosed is capable of considerable modifications, alterations, combinations, and equivalents in form and function, as will occur to those skilled in the art and having the benefit of this disclosure.

FIG. 1 depicts an embodiment of a system configured for delivering viscosified treatments fluids comprising the breaker coated particulates of the embodiments described herein to a downhole location.

DETAILED DESCRIPTION

The embodiments herein relate generally to subterranean formation operations and, more particularly, to breaker coated particulates. Specifically, the breaker coated particulates ("BCP") of the present disclosure comprise particulates at least partially coated with a first layer of a stabilization agent, followed by a second layer of a breaker. The breaker may be held onto the particulates by the stabilization agent.

The presence of the breaker on the particulates may provide a number of advantages facilitating efficiency both in terms of time and cost for subterranean formation operations requiring a viscosified treatment fluid having particulates suspended therein (e.g., a drilling operation, a fracturing operation, a gravel packing operation, a frac-packing operations, and the like). Specifically, the BCPs of the present disclosure may be made on-the-fly at the well site or may be pre-formed and stored for later use in a viscosified treatment fluid, as will be discussed in greater detail below. Allowing storage of the BCPs already having a breaker coated thereon may provide a practical and economical approach to storing and transporting these particulates, while consolidating the amount of chemicals and additives required at the well site. As used herein, the term "on-the-fly" refers to performing an operation during a subterranean formation operation (e.g., a treatment) that does not require stopping normal operations.

The BCPs of the present disclosure further permit a lower amount of breaker to be used to break a viscosified treatment fluid. As used herein, the term "breaker" refers to any substance that is capable of decreasing the viscosity of a fluid (e.g., by breaking the crosslinks in a crosslinked gelling agent). This is so because the breaker itself is coated onto the particulates forming the BCPs, thus allowing a more controlled interaction between gelling agents and the breaker rather than if the breaker is merely free-floating in the viscosified treatment fluid, since the gelling agent interacts with the particulate (e.g., to suspend the particulate) and a free-floating breaker may fail to encounter a gelling agent at a location suspending the particulate.

Moreover, the presence of the breaker coated onto the particulates forming the BCPs described herein permits substantially complete, if not complete, removal of gelling agents from association with the particulates. As used herein, the term "substantially" means largely but not necessarily wholly. Accordingly, a lesser amount of residue from the gelling agent as compared to traditional operations remains associated with the particulates, which may enhance production of the subterranean formation. For example, when the BCPs are used to form a particulate pack, as discussed in detail below, the presence of the breaker on the BCPs allows the gelling agent to be broken where such gelling agents are in contact with the BCPs, thus reducing the residue remaining associated with the particulate pack and enhancing the conductivity and production of hydrocarbons (or other desirable fluids) therethrough.

The BCPs of the present disclosure further maintain the desirable properties of particulates for use in forming particulate packs in subterranean formations, including proppant and gravel packs, for example. Moreover, the stabilization agent coated onto the BCPs is not rendered ineffective, despite the coating of the breaker, particularly after activating the breaker, such that the BCPs exhibit at least some properties of fines migration control, particulate flowback control, conductivity enhancement of a particulate pack, and the like.

In some embodiments, the methods and compositions described herein may be described with reference to a hydraulic fracturing operation (e.g., formation of a particulate pack). However, the BCPs of the present disclosure may be used in any other subterranean formation operation that may require a breakable viscosified treatment fluid having particulates suspended therein. Such subterranean formation operations may include, but are not limited to, a stimulation operation, an acid-fracturing operation, a fracturing operation, a frac-packing operation, a remedial operation, and any combination thereof.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques. In general, the term "about" when modifying a numerical list may mean a fluctuation of ±5% of the listing numerical value, encompassing any value and subset therebetween.

While compositions and methods are described herein in terms of "comprising" various components or steps, the compositions and methods can also "consist essentially of" or "consist of" the various components and steps. When "comprising" is used in a claim, it is open-ended.

In some embodiments, the present disclosure provides a viscosified treatment fluid comprising a base fluid, a gelling agent, and breaker coated particulates ("BCPs"). The BCPs may comprise particulates at least partially coated with a first layer of a stabilization agent followed by a second layer of a breaker. That is, the first layer of the stabilization agent is at least partially coated onto the particulates and the second layer of the breaker is at least partially coated onto the particulates. The stabilization agent may be coated onto the particulate and hold the breaker onto the particulate therewith, such as due to a tacky nature of the stabilization agent. As used herein, the term "tacky," and grammatical variants thereof, refers to a substance having a nature such that it is somewhat sticky to the touch and capable of being applied to a substrate. The stabilization agent of the present disclosure may be in liquid or dry form and either or both may be coated onto a particulate to form the BCPs described herein, and thus the stabilization agent may be liquid coated or dry coated thereon. Application of the stabilization agent to the particulates described herein, however, may not be the result of or solely the result of a tacky nature of the stabilization agent and may be, instead, due to a reaction with the surface of the particulate forming a bond (e.g., an ionic bond, a covalent bond, a van der Waals bond, and the like) between the particulate and the stabilization agent.

Referring now to the BCPs of the present disclosure; as described previously, the BCPs are formed by at least partially coating a first layer of a stabilization agent followed by a second layer of a breaker onto a particulate. Two or more types of stabilization agent and/or two or more types of breaker may be used alone or in combination for forming the BCPs, without departing from the scope of the present disclosure, which may permit the use of multiple gelling agents in the viscosified treatment fluids described herein, or may allow the BCPs to be more compatible with an array of gelling types at any particular time of use.

The particulate used in the formation of the BCPs described herein may be any type of solid or porous particulate suitable for use in a subterranean formation operation and, in those embodiments where the BCPs are used to prop open a fracture, any particulate capable of withstanding fracture closure pressures in a particular subterranean formation. The porous particulates suitable for use in forming the BCPs of the present disclosure may have a porosity in the range of a lower limit of about 10%, 15%, 20%, 25%, 30%, 35%, and 40% to an upper limit of about 70%, 65%, 60%, 55%, 50%, 45%, and 40%, encompassing any value and subset therebetween. As used herein, unless otherwise specified, the term "particulate" will include both solid and porous particulates. The particulate forming the BCPs may further be suitable for a variety of subterranean formation operations including, but not limited to, a proppant particulate, a gravel particulate, a weighting agent, a fluid loss particulate, a density reducing particulate, a degradable particulate, and any combination thereof. In some embodiments, the particulate may be inert or reactive, provided that it does not interfere with the stabilization agent and/or the breaker prior to the desired time or conditions for the breaker to break a viscosified fluid in which the particulate forming the BCPs is included. For example, in some embodiments, the particulate may be a reactive particulate that degrades, as discussed in greater detail below, and may be designed or selected to degrade after the operation of the breaker, without departing from the scope of the present disclosure.

Suitable materials for the particulates used in forming the BCPs described herein may include, but are not limited to, sand, bauxite, ceramic materials, glass materials, polymer materials (e.g., ethylene vinyl acetate, composite materials, and the like), polytetrafluoroethylene materials, nut shell pieces, cured resinous particles comprising nut shell pieces, seed pieces (e.g., nutmeg, and the like), cured resinous particles comprising seed pieces, seed shell pieces, cured resinous particles comprising seed shell pieces, fruit pit pieces, cured resinous particles comprising fruit pit pieces, wood, composite particles, and any combination thereof. Suitable composite particles may comprise a binder and a filler material wherein suitable filler materials may include, but are not limited to, any of the foregoing materials suitable for forming the particulates herein, silica, alumina, fumed carbon, carbon black, graphite, mica, titanium dioxide, barite, meta-silicate, calcium silicate, kaolin, talc, zirconia, boron, fly ash, hollow glass microspheres, solid glass, and the like, and any combination thereof.

Suitable particulates for use in the methods of the present disclosure for forming the BCPs may be of any size and shape combination suitable for use in a subterranean formation operation (e.g., a hydraulic fracturing operation). Generally, where the chosen particulate is substantially spherical, suitable particulates may have a size in the range of from a lower limit of about 2 mesh, 20 mesh, 40 mesh, 60 mesh, 70 mesh, 80 mesh, 100 mesh, 120 mesh, 140 mesh, 160 mesh, 180 mesh, and 200 mesh to an upper limit of about 400 mesh, 380 mesh, 360 mesh, 340 mesh, 320 mesh, 300 mesh, 280 mesh, 260 mesh, 240 mesh, 220 mesh, and 200 mesh, U.S. Sieve Series, and encompassing any value and any subset therebetween. In some embodiments, the particulates described herein may be smaller than 400 mesh (e.g., may be as small as about 4800 mesh, an estimated sieve size equaling about 2 microns, or even smaller). In some embodiments, the particulates may have a size in the range of from about 8 to about 120 mesh, U.S. Sieve Series. In some embodiments, the particulates may have a median size in the range of about 1 micron to about 50 microns, without departing from the scope of the present disclosure. A major advantage of using this method is there is no need for the particulates to be sieved or screened to a particular particle mesh size or particular particle size distribution, but rather a wide or broad particle size distribution can be used.

In some embodiments, it may be desirable to use substantially non-spherical particulates. Suitable substantially non-spherical particulates may be cubic, polygonal, fibrous, or any other non-spherical shape. Such substantially non-spherical particulates may be, for example, cubic-shaped, rectangular-shaped, rod-shaped, ellipse-shaped, cone-shaped, pyramid-shaped, or cylinder-shaped. That is, in embodiments wherein the particulates are substantially non-spherical, the aspect ratio of the material may range such that the material is fibrous to such that it is cubic, octagonal, or any other configuration. Substantially non-spherical particulates may be generally sized such that the longest axis is from a lower limit of about 0.02 inches ("in"), 0.04 in, 0.06 in, 0.08 in, 0.1 in, 0.12 in, 0.14 in, and 0.16 in to an upper limit of about 0.3 in, 0.28 in, 0.26 in, 0.24 in, 0.22 in, 0.2 in, 0.18 in, and 0.16 in in length, and encompassing any value and any subset therebetween. In other embodiments, the longest axis may be from about 0.05 inches to about 0.2 inches in length. In one embodiment, the substantially non-spherical particulates may be cylindrical, having an aspect ratio of about 1.5 to 1, a diameter of about 0.08 in, and a length of about 0.12 in. In another embodiment, the substantially non-spherical particulates may be cubic, having sides of about 0.08 inches in length. The use of substantially non-spherical particulates may be desirable in some embodiments because, among other things, they may provide a lower rate of settling when slurried into the treatment fluid (e.g., prior to reacting the gelling agent and the crosslinking agent). By so resisting settling, substantially non-spherical particulates may provide improved particulate distribution as compared to more spherical particulates. It will be appreciated, however, that any combination of spherical and non-spherical particulates may be used for forming the BCPs described herein, without departing from the scope of the present disclosure.

In some embodiments of the present disclosure, the particulates may be formed from degradable particles, as previously described, provided that the degradable particles do not interfere with the stabilization agent and breaker forming the BCPs. As used herein, the term "degradable," and all of its grammatical variants (e.g., "degrade," "degradation," "degrading," and the like), refers to the dissolution or chemical conversion of materials into smaller components, intermediates, or end products by at least one of solubilization, hydrolytic degradation, biologically formed entities (e.g., bacteria or enzymes), chemical reactions, electrochemical processes, thermal reactions, or reactions induced by radiation. In some embodiments, such as where the BCPs are placed into a fracture and/or an annulus between a screen and the wellbore to form a particulate pack, the degradable particles may be included to increase the permeability of the particulate pack. The degradable particles may be preferably substantially uniformly distributed throughout the formed particulate pack. Over time, the degradable particles will degrade, in situ, causing the degradable material to substantially be removed from the particulate pack and to leave behind voids therein. These voids may enhance the porosity of the particulate pack, which may result, in situ, in enhanced conductivity and production of the subterranean formation.

Suitable degradable materials for forming the degradable particles that may be used as particulates in forming the BCPs may include, for example, oil-degradable polymers. Oil-degradable polymers that may be used in accordance with the embodiments of the present disclosure may be either natural or synthetic polymers. Some particular examples may include, but are not limited to, polyacrylics, polyamides, polyolefins (e.g., polyethylene, polypropylene, polyisobutylene), polystyrene, and the like, and any combination thereof. Other suitable oil-degradable polymers may include those that have a melting point which is such that the polymer will dissolve at the temperature of the subterranean formation in which it is placed, such as a wax material.

In addition to oil-degradable polymers, other degradable materials that may be used in conjunction with the embodiments of the present disclosure may include, but are not limited to, degradable polymers, dehydrated salts, and any combination thereof. The degradability of a polymer depends at least in part on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, additives, and the like. Also, the environment to which the polymer is subjected may affect how it degrades, such as temperature, presence of moisture, oxygen, microorganisms, enzymes, pH, and the like.

Suitable examples of degradable polymers that may be used in accordance with the embodiments of the present disclosure may include, but are not limited to, polysaccharides (e.g., dextran or cellulose), chitins, chitosans, proteins, aliphatic polyesters, poly(lactides), poly(glycolides), poly($\varepsilon$-caprolactones), poly(hydroxybutyrates), poly(anhydrides), aliphatic or aromatic polycarbonates, poly(orthoesters), poly(amino acids), poly(ethylene oxides), polyphosphazenes, and the like, and any combination thereof.

Polyanhydrides are another type of suitable degradable polymer useful in the embodiments of the present disclosure. Polyanhydride hydrolysis proceeds, in situ, via free carboxylic acid chain-ends to yield carboxylic acids as final degradation products. The erosion time can be varied over a broad range of changes in the polymer backbone. Examples of suitable polyanhydrides may include, but are not limited to, poly(adipic anhydride), poly(suberic anhydride), poly(sebacic anhydride), poly(dodecanedioic anhydride), poly(maleic anhydride) and poly(benzoic anhydride), and the like, and any combination thereof.

Dehydrated salts may be used in accordance with the embodiments of the present disclosure as a degradable material. A dehydrated salt may be suitable if it will degrade over time as it hydrates. For example, a particulate solid anhydrous borate material that degrades over time may be suitable. Specific examples of particulate solid anhydrous borate materials that may be used include, but are not limited to, anhydrous sodium tetraborate (also known as anhydrous borax), anhydrous boric acid, and the like, and any combination thereof. These anhydrous borate materials are only slightly soluble in water. However, with time and heat in a subterranean environment, the anhydrous borate materials react with the surrounding aqueous fluid and are hydrated. The resulting hydrated borate materials are highly soluble in water as compared to anhydrous borate materials and as a result degrade in the aqueous fluid. In some instances, the total time required for the anhydrous borate materials to degrade in an aqueous fluid is in the range of from about 8 hours to about 72 hours depending upon the temperature of the subterranean zone in which they are placed. Other examples include organic or inorganic salts like acetate trihydrate.

Blends of any of the foregoing degradable materials may also be suitable. One example of a suitable blend of materials is a mixture of poly(lactic acid) and sodium borate where the mixing of an acid and base could result in a neutral solution where this is desirable. Another example may include a blend of poly(lactic acid) and boric oxide. Other materials that undergo an irreversible degradation may also be suitable, if the products of the degradation do not undesirably interfere with either the conductivity of the proppant matrix or with the production of any of the fluids from the subterranean formation.

The stabilization agent used to at least partially coat the particulates with a first layer for forming the BCPs described herein may be any stabilization agent capable of being coated onto the particulates described herein and capable of holding a breaker thereon. As discussed above, the stabilization agent may be at least partially coated onto the particulates by means of a chemical bond or by virtue of the tackiness of the stabilization agent itself. In some embodiments, the stabilization agent is not itself tacky upon being coated onto the particulate but may be "activated" (e.g., destabilized, coalesced, solubilized, reacted such as by temperature, pH, moisture content, pressure, and the like, and combinations thereof) to become tacky. In some embodiments, the ability of the stabilization agent to be activated may facilitate coating on-the-fly of the breaker atop the stabilization agent simply by mixing the components together, such as during introduction of each into a viscosified treatment fluid, which may be performed while introducing the viscosified treatment fluid into a subterranean formation. The ability of the stabilization agent to remain un-tacky until activated may also facilitate storage and transport of the particulates having the stabilization agent at least partially coated thereon without yet forming the BCPs with the second layer of the breaker.

As used herein, the term "at least partially coated" referring to both the stabilization agent and the subsequent breaker refers to a coating covering at least about 5% of the surface area of the outer surface of the particulate forming the BCPs. Coating the surface area of the particulates by at least 5% of the stabilization agent and/or breaker allows the particulates to agglomerate at a downhole location and form a particulate pack, where such formation is desirable, such as during a hydraulic fracturing operation. A greater amount of coating, up to 100%, may be employed according to the embodiments of the present disclosure. In some embodiments, more or less coating of the stabilization agent and/or breaker may be desired depending upon, but not limited to, the amount of agglomeration of the particulates desired, the type or types of stabilization agent selected (e.g., the amount of tackiness provided), the type or types of breaker selected, other additives included in the viscosified treatment fluids, and the like.

Generally, to achieve the desired at least partial coating of the stabilization agent onto the particulates to form the BCPs of the present disclosure, the stabilization agent is present in the range of a lower limit of about 0.1%, 0.2%, 0.3%, 0.4%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, and 2.5% to an upper limit of about 5%, 4.9%, 4.8%, 4.7%, 4.6%, 4.5%, 4.4%, 4.3%, 4.2%, 4.1%, 4%, 3.9%, 3.8%, 3.7%, 3.6%, 3.5%, 3.4%, 3.3%, 3.2%, 3.1%, 3%, 2.9%, 2.8%, 2.7%, 2.6%, and 2.5% by volume/weight percent (v/w %) of the particulates, encompassing any value and subset therebetween. In some embodiments, the range may be, but may not necessarily be, tighter, such as in the range of about 0.1% to about 4%, or about 0.1% to about 3%, or about 0.1% to about 2%, or about 0.1% to about 1%, without departing from the scope of the present disclosure. Higher ranges may also be suitable, without departing from the scope of the present disclosure. The amount of stabilization agent selected, as discussed previously, may depend on the coating amount on the particulate desired, cost concerns, and the like.

In some embodiments, the stabilization agent selected for use in forming the BCPs of the present disclosure may be aqueous tackifying agents, non-aqueous tackifying agents, silyl-modified polyamides, and any combination thereof. As discussed, in some instances, the stabilization agent may not generally be significantly tacky when at least partially coated onto the particulates, but may become so upon some type of activation, which may facilitate coating of the breaker, as described below, as a second layer onto the particulates.

In some embodiments, a pretreatment may be first contacted with the surface of a particulate to prepare it to be coated with a stabilization agent. In particular embodiments, where the particulate surface lacks an adequately receptive surface for the stabilization agent (e.g., the particulate surface lacks a charge substantially opposite of the chosen stabilization agent) a pretreatment may be used to make the particulate surface more receptive to the stabilization agent. The pretreatment may include, but is not limited to, a charged surfactant, a charged polymer, and any combination thereof. For example, a pretreatment cationic surfactant and/or polymer may be used to treat a particulate surface with a negative zeta potential, or an anionic surfactant or polymer may be used to treat the particulate surface with a positive zeta potential. As will be understood, amphoteric and zwitterionic pretreatments may also be used provided that the conditions they are exposed to during use are such that they display the desired charge. In some embodiments, the pretreatment may be used in the range of a lower limit of about 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, and 1% to an upper limit of about 2%, 1.95%, 1.9%, 1.85%, 1.8%, 1.75%, 1.7%, 1.65%, 1.6%, 1.55%, 1.5%, 1.45%, 1.4%, 1.35%, 1.3%, 1.25%, 1.2%, 1.15%, 1.1%, 1.05%, and 1% by volume/weight percent (v/w %) of the particulates, encompassing any value and subset therebetween.

Suitable aqueous tackifying agents may include any polymer that can be coated onto a particulate and hold a second coating of a breaker thereatop, such as by virtue of the tackiness of the aqueous tackifying agent, as described previously. In some embodiments, suitable aqueous tackifying agents may also be able to bind, coagulate, or flocculate particulate. Examples of aqueous tackifying agents suitable for use in the embodiments herein may include, but are not limited to, a charged polymer, a polyamide, an acrylic acid polymer, an acrylic acid derivative polymer, an acrylic acid homopolymer, an acrylic acid ester homopolymer (e.g., poly(methyl acrylate), poly(butyl acrylate), poly (2-ethylhexyl acrylate), and the like), an acrylic acid ester co-polymer, a methacrylic acid derivative polymer, a methacrylic acid homopolymer, a methacrylic acid ester homopolymer (e.g., poly(methyl methacrylate), poly(butyl methacrylate), poly(2-ethylhexyl methacrylate), and the like), an acrylamido-methyl-propane sulfonate polymer, an acrylamido-methyl-propane sulfonate derivative polymer, an acrylamido-methyl-propane sulfonate co-polymer, an acrylic acid/acrylamido-methyl-propane sulfonate co-polymer, any derivatives thereof, and the like, and any combination thereof. As used herein, the term "derivative" refers to any compound that is made from one of the listed compounds, for example, by replacing one atom in one of the listed compounds with another atom or group of atoms, ionizing one of the listed compounds, or creating a salt of one of the listed compounds.

Suitable aqueous tackifying agents may comprise at least one member selected from the group consisting of benzyl coco di-(hydroxyethyl) quaternary amine, p-T-amyl-phenol condensed with formaldehyde, and a copolymer comprising from about 80% to about 100% $C_1$-$C_{30}$ alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. The term "copolymer," as used herein, is not limited to polymers comprising two types of monomeric units, but includes any combination of monomeric units (e.g., terpolymers, tetrapolymers, and the like). Suitable hydrophillic monomers may be any monomer that will provide polar oxygen-containing or nitrogen-containing groups. Suitable hydrophillic monomers may include, but are not limited to, dialkyl amino alkyl (meth)acrylates and their quaternary addition and acid salts, acrylamide, N-(dialkyl amino alkyl) acrylamide, methacrylamides and their quaternary addition and acid salts, hydroxy alkyl (meth) acrylates, unsaturated carboxylic acids such as methacrylic acid or acrylic acid, hydroxyethyl acrylate, acrylamide, and the like, and any combination thereof. These copolymers can be made by any suitable emulsion polymerization technique.

Non-aqueous tackifying agents suitable for use in the embodiments disclosed herein may be used such that they cure to form a non-hardened coating, or may be combined with a multifunctional material capable of reacting with the non-aqueous tackifying compound to cure to form a hardened coating. As used herein, the term "cure" and grammatical variants thereof (e.g., "curing") refers to substantially non-flowable reaction product, such as through the process of cross-linking chemical reactions of the stabilization agent. A "hardened coating" as used herein means that the reaction of the non-aqueous tackifying agent with the multifunctional material will result in a substantially non-flowable reaction product that exhibits a higher compressive strength in a consolidated agglomerate than the non-aqueous tackifying agent alone. In this instance, the non-aqueous tackifying agent may function similarly to a curable resin.

For use in the embodiments described herein, the non-aqueous tackifying agents may comprise polyamides that are liquids or in solution at the temperature of the subterranean formation such that they are, by themselves, non-hardening when introduced into the subterranean formation. A particularly preferred product is a condensation reaction product comprised of a polyacid and a polyamine. The non-aqueous tackifying agents may further comprise amounts of dibasic acids containing some trimer and higher oligomers and also small amounts of monomer acids that are reacted with polyamines, without departing from the scope of the present disclosure. Other polyacids for use as the non-aqueous tackifying agents may include, but are not limited to, trimer acids, synthetic acids produced from fatty acids, maleic anhydride, acrylic acid, and the like, and combinations thereof. Additional compounds which may be used as non-aqueous tackifying agents include liquids and solutions of, for example, polyesters, polycarbonates, silyl-modified polyamide compounds, polycarbamates, urethanes, natural resins such as shellac, and the like. Combinations of these may be suitable as well.

Multifunctional materials suitable for use in the present disclosure may include, but are not limited to, an aldehyde (e.g., formaldehyde); a dialdehyde (e.g., glutaraldehyde, hemiacetals or aldehyde releasing compounds); a diacid halide; a dihalide (e.g., dichlorides and dibromides); a polyacid anhydride (e.g., citric acid, epoxides, furfuraldehyde, glutaraldehyde or aldehyde condensates); and any combination thereof. In some embodiments, the multifunctional material may be mixed with the non-aqueous tackifying agent in an amount of from a lower limit of about 0.01%, 0.5%, 0.1%, 0.5%, 1%, 5%, 10%, and 15% to an upper limit of about 50%, 45%, 40%, 35%, 30%, 25%, 20%, and 15% by weight of the non-aqueous tackifying agent. In other embodiments, the multifunctional material may be mixed with the non-aqueous tackifying agent in an amount of from about 0.5% to about 1% by weight of the non-aqueous tackifying agent.

Suitable silyl-modified polyamide compounds that may be used as a stabilization agent in the embodiments of the present disclosure may be based, for example, on the reaction product of a silating compound with a polyamide or a combination of polyamides. The polyamide or combination of polyamides may be one or more polyamide intermediate compounds obtained, for example, from the reaction of a polyacid (e.g., diacid or higher) with a polyamine (e.g., diamine or higher) to form a polyamide polymer with the elimination of water.

An example of a suitable stabilization agent for use in forming the BCPs of the present disclosure includes SANDWEDGE® NT, a polyamide non-aqueous tackifying agent, available from Halliburton Energy Services, Inc. in Houston, Tex.

A breaker may be at least partially coated on the particulates to form a second layer thereon atop the stabilization agent. As described above, the breaker may be coated such that it covers at least about 5% of the surface area of the outer surface of the particulate forming the BCPs. Accordingly, in some embodiments, both the stabilization agent and the breaker may be coated to only cover about 5% or greater of the surface area of the particulate (i.e., both the stabilization agent and the breaker coat the same surface area). In other embodiments, however, the stabilization agent may coat a greater surface area of the particulate than the breaker, which is coated atop the stabilization agent, without departing from the scope of the present disclosure. Like the stabilization composition, the breaker may coat 100% of the surface area of the particulate, or a value between about 5% and 100%, without departing from the scope of the present disclosure, and encompassing any value and subset therebetween.

Generally, to achieve the desired at least partial coating of the breaker onto the particulates to form the BCPs of the present disclosure, the breaker is present in the range of a lower limit of about 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, and 1% to an upper limit of about 2%, 1.95%, 1.9%, 1.85%, 1.8%, 1.75%, 1.7%, 1.65%, 1.6%, 1.55%, 1.5%, 1.45%, 1.4%, 1.35%, 1.3%, 1.25%, 1.2%, 1.15%, 1.1%, 1.05%, and 1% by volume/weight percent (v/w %) of the particulates, encompassing any value and subset therebetween. In some embodiments, the range may be, but may not necessarily be, tighter, such as in the range of about 0.1% to about 1.5%, or about 0.1% to about 1%, or about 0.1% to about 0.5%, without departing from the scope of the present disclosure. Higher ranges may also be suitable, without departing from the scope of the present disclosure. The amount of breaker selected, as discussed previously, may depend on the coating amount on the particulate desired, cost concerns, and the like. Generally, however, the amount of breaker required in the embodiments described herein is less than that generally required when the breaker is not associated (i.e., coated) onto the particulates, such as the BCPs described herein.

Suitable breakers for use in forming the BCPs of the present disclosure may include, but are not limited to, an oxidative breaker, an acid breaker, a delayed release acid breaker, a delayed release enzyme breaker, a temperature activated breaker, a hydrolysable ester breaker, any encapsulated in an encapsulating material, and any combination thereof. The breakers described herein may be in solid or liquid form, without departing from the scope of the present disclosure. When in liquid form, the liquid breaker is encapsulated in an encapsulating material to facilitate at least partial coating of the breaker onto the particulates atop the stabilization agent to form the BCPs described herein. The encapsulating material may be any encapsulating material described below in detail. Thus, whether in solid or encapsulated liquid form, the breaker may be at least partially coated onto the particulates atop the stabilization agent to form the BCPs described herein. Moreover, a combination of encapsulated liquid and solid form breakers may additionally be used to form the BCPs described herein, without departing from the scope of the present disclosure. The breaker may be coated atop the stabilization agent by virtue of the tackiness of the stabilization agent, or in other instances by formation of a chemical bond, such as those described with reference to the stabilization agent coated onto the particulates. For example, in some instances, the hydrophobic nature of a stabilization agent may favor adsorption of the breaker such that it forms the second layer on the particulate. Furthermore, the breaker may be dry coated or liquid coated as a second layer atop the stabilization agent to form the BCPs described herein. Either type of coating may be performed on-the-fly, without departing from the scope of the present disclosure. In some embodiments, the breaker may be encapsulated in any one or more of the encapsulating materials discussed below with reference to the BCPs described herein, such as to delay release of the breaker and/or to interact synergistically with an encapsulating material encapsulating some or all of the BCP itself, as discussed in more detail below.

Examples of oxidative breakers may include, but are not limited to, organic peroxides, alkali metal persulfates, alkali metal chlorites, bromates, chlorates, hypochlorites, permanganates, sodium chloride and the like, and any combination thereof. Examples of acid breakers may include, but are not limited to, hydrochloric acid, hydrofluoric acid, hydrobromic acid, hydroiodic acid, sulfuric acid, nitric acid, boric acid, chromic acid, chlorous acid, and the like, and any combination thereof. Examples of delayed release acid breakers may include, but are not limited to, acetic anhydride and organic and inorganic acids such as fumaric acid, benzoic acid, sulfonic acid, phosphoric acids, aliphatic polyesters, poly lactic acid, poly(lactides), polyanhydrides, poly (amino acids), and the like, and any combination thereof.

Examples of suitable delayed release enzyme breakers may include, but are not limited to, alpha and beta amylases, exo- and endo-glucosidases, amyloglucosidase, oligoglucosidase, invertase, maltase, cellulase, hemicellulase, endoglucosidase, endo-xylanase, exo-xylanase, and the like, and any combination thereof. In some embodiments, the enzyme breakers are enzymes or combinations of enzymes that attack the glucosidic linkages of a cellulose gelling agent backbone and degrade the gelling agent into mostly mono-saccharide and disaccharide units. Temperature activated breakers may activate by being heated by the subterranean zone in which they are placed, or by another external heat source. Examples of suitable temperature activated breakers may include, but are not limited to, alkaline earth metal peroxides, such as calcium peroxide and magnesium peroxide, zinc peroxide, and the like, and any combination thereof. Examples of suitable hydrolysable esters may include, but are not limited to, sorbitol, catechol, dimethyl glutarate and mixtures of dimethyl glutarate, dimethyl succinate, dimethyl adipate, and the like, and any combination thereof.

An example of a suitable breaker for use in forming the BCPs of the present disclosure includes VICON NF™ BREAKER, a chlorous acid and sodium chloride breaker, available from Halliburton Energy Services, Inc. in Houston, Tex.

In some embodiments, the viscosified treatment fluids of the present disclosure may further comprise a free-floating breaker. As used herein, the term "free-floating" breaker refers to a breaker that is not coated or otherwise bound to the BCPs of the present disclosure (e.g., a breaker that is not able to be coated onto the particulates because a breaker has already exhausted any area in which to bind to the stabilization agent first coated onto the particulates, whether by using up the entire surface area of the stabilization agent or by curing of the stabilization agent such that it is no longer tacky). The free-floating breaker may be included in the viscosified treatment fluids of the present disclosure to facilitate breaking of the fluid in combination with the BCPs, such as to contact gelling agents that are not in association with the BCPs, for example. The free-floating breaker may be any breaker suitable for use in forming the BCPs and may be present in the viscosified treatment fluids described herein in an amount in the range of from a lower limit of about 0.001%, 0.01%, 0.025%, 0.05%, 0.075%, 0.1%, 0.125%, 0.15%, 0.175%, 0.2%, 0.225%, and 0.25% to an upper limit of about 0.5%, 0.475%, 0.45%, 0.425%, 0.4%, 0.375%, 0.35%, 0.325%, 0.3%, 0.275%, and 0.25% by weight of the viscosified treatment fluid, encompassing any value and subset therebetween. Like the breaker forming the BCPs, the amount of free-floating breaker used in the embodiments described herein may be substantially less than typical free-floating breakers in traditional treatment fluids.

In some embodiments, the BCPs of the present disclosure may be encapsulated in an encapsulating material, such as to facilitate storage or transport of the BCPs (e.g., by preventing sticking or clumping of the BCPs), to delay release of the breaker, to delay grain-to-grain or grain-to-formation contact using the stabilization agent, and the like. Generally, the encapsulating material will encompass all or a portion, preferably a large portion (greater than about 50%) of the BCPs and will degrade over time upon exposure to a certain environment (e.g., temperature, time alone, salinity, pH, pressure, and the like).

Suitable encapsulating materials for encapsulation of the BCPs described herein may include, but are not limited to, a corn starch, a wheat starch, a potato starch, a barley starch, a bean starch, a cassava starch, a ground rice, a ground corn, a ground wheat, a ground bean, a ground guar gum, a cellulose, a cellulose derivative, a polyacrylate, a polymethacrylate, a polyacrylamide, a polyvinylpyrrolidone, a polylactic acid, an ethylene propylene diene monomer rubber, a polyvinylidene chloride, a nylon, a wax, a polyurethane, a cross-linked partially hydrolyzed acrylic, a shellac, a calcium sulfate, a calcium chloride, a cementitious material, a salt, barium sulfate, benzoic acid, polyvinyl alcohol, sodium carbonate, sodium bicarbonate, calcium oxide, a degradable polymer, a polyglycolide, a poly(ε-caprolactone), a poly (hydroxybutyrate), a poly(anhydride), an aliphatic polycarbonate, a polyorthoester, a poly(amino acid), a poly(ethylene oxide), a poly(phosphazene), and any combination thereof. Any of the materials used in forming the degradable particles of the present disclosure discussed above for use as the particulates in forming the BCPs may also be used as an encapsulating material, without departing from the scope of the present disclosure.

The viscosified treatment fluids comprising the BCPs of the present disclosure additionally comprise a base fluid and a gelling agent. The base fluid for use in forming the viscosified treatment fluids described herein may be any base fluid that does not adversely interfere with the BCPs, including the stabilization agent and the breakers forming the BCPs, of the present disclosure. Generally, suitable base fluids include, but are not limited to, aqueous-based fluids, aqueous-miscible fluids, and any combination thereof. Suitable aqueous-based fluids may include fresh water, saltwater (e.g., water containing one or more salts dissolved therein), brine (e.g., saturated salt water), seawater, and the like, any combination thereof. Suitable aqueous-miscible fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and the like, and any combination thereof.

The gelling agents for use in viscosified treatment fluids may be any substance capable of gelling the viscosified treatment fluids, that does not adversely affect the other components of the fluids described herein (e.g., the BCPs) and that may be used in a subterranean formation operation. Suitable gelling agents may include, but are not limited to, natural polymers, synthetic polymers, and any combination thereof.

Suitable gelling agents may include, but are not limited to, polysaccharides, biopolymers, and/or derivatives thereof that contain one or more of these monosaccharide units: galactose, mannose, glucoside, glucose, xylose, arabinose, fructose, glucuronic acid, or pyranosyl sulfate. Examples of suitable polysaccharides may include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, succinoglycan, diutan, and the like, and any combination thereof.

Suitable synthetic polymers may include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamido-and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, derivatives thereof, and the like, and any combination thereof. In certain embodiments, the gelling agent may comprise an acrylamide/2-(methacryloyloxy)ethyltrimethylammonium methyl sulfate copolymer. In other embodiments, the gelling agent may comprise an acrylamide/2-(methacryloyloxy)ethyltrimethylammonium chloride copolymer. In certain embodiments, the gelling agent may comprise a derivatized cellulose that comprises cellulose grafted with an allyl or a vinyl monomer.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

In some embodiments, the gelling agent may be present in the viscosified treatment fluids described herein in an amount in the range of from a lower limit of about .0.01%, 0.05%, 0.1%, 0.25%, 0.5%, 0.75%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, and 5% to an upper limit of about 10%, 9.75%, 9.5%, 9.25%, 9%, 8.75%, 8.5%, 8.25%, 8%, 7.75%, 7.5%, 7.25%, 7%, 6.75%, 6.5%, 6.25%, 6%, 5.75%, 5.5%, 5.25%, and 5% by weight of the liquid component of the viscosified treatment fluids, encompassing any value and subset therebetween.

In some embodiments, it may be desirable to crosslink the gelling agent and, in such embodiments, the viscosified treatment fluids may further comprise one or more crosslinking agents. The crosslinking agents may comprise a borate ion, a metal ion, or similar component that is capable of crosslinking at least two molecules of the gelling agent. Examples of suitable crosslinking agents may include, but are not limited to, borate ions, magnesium ions, zirconium IV ions, titanium IV ions, aluminum ions, antimony ions, chromium ions, iron ions, copper ions, magnesium ions, zinc ions, and the like, and any combination thereof. These ions may be provided by providing any compound that is capable of producing one or more of these ions. Examples of such compounds may include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and the like, and any combination thereof.

In certain embodiments, the crosslinking agent may be formulated to remain inactive until it is "activated" by, among other things, certain conditions in the viscosified treatment fluids (e.g., pH, temperature, etc.) and/or interaction with some other substance. In some embodiments, the activation of the crosslinking agent may be delayed by encapsulation with an encapsulating material (e.g., in the form of a porous coating through which the crosslinking agent may diffuse slowly, a degradable coating that degrades downhole, and the like) that delays the release of the crosslinking agent until a desired time or place. The encapsulating material may be any one or more of the encapsulating materials discussed previously with reference to the BCPs described herein. The choice of a particular crosslinking agent will be governed by several considerations, including, but not limited to, the type of gelling agent selected, the molecular weight of the gelling agent(s) selected, the conditions in the subterranean formation being treated, the safety handling requirements, the pH of the viscosified treatment fluid, temperature, the desired delay for the crosslinking agent to crosslink the gelling agent molecules, and the like.

When included, suitable crosslinking agents may be present in the viscosified treatment fluids described herein in an amount sufficient to provide the desired degree of crosslinking between molecules of the gelling agent. In certain embodiments, the crosslinking agent may be present in the viscosified treatment fluids in an amount in the range of from a lower limit of about 0.005%, 0.05%, 0.1%, 0.15%, 0.2%, 0.25%, 0.3%, 0.35%, 0.4%, 0.45%, and 0.5% to an upper limit of about 1%, 0.95%, 0.9%, 0.85%, 0.8%, 0.75%, 0.7%, 0.65%, 0.6%, 0.55%, and 0.5% by weight of the liquid component of the viscosified treatment fluids, encompassing any value and subset therebetween.

In some embodiments, the viscosified treatment fluids of the present disclosure may further comprise any of the particulates types described herein for forming the BCPs of the present disclosure, which are not coated (e.g., not coated with either the stabilization agent or the breaker). These non-coated particulates may be made of any type (e.g., solid or porous), of any material (e.g., non-degradable, degradable, and the like), of any size, and or any shape described previously with reference to forming the BCPs described herein, without limitation. In some embodiments, the combined non-coated particulates and BCPs are present in the range of from a lower limit of about 0.001%, 0.01%, 0.025%, 0.05%, 0.075%, 0.1%, 0.125%, 0.15%, 0.175%, 0.2%, 0.225%, and 0.25% to an upper limit of about 0.5%, 0.475%, 0.45%, 0.425%, 0.4%, 0.375%, 0.35%, 0.325%, 0.3%, 0.275%, and 0.25% by weight of the viscosified treatment fluid, encompassing any value and subset therebetween. Where such combined non-coated particulates and BCPs are present in the viscosified treatment fluids described herein, the BCPs may be present in the range of from a lower limit of about 5%, 10%, 15%, 20%, 25%, 30%, 35%, 40%, 45%, and 50% to an upper limit of about 95%, 90%, 85%, 80%, 75%, 70%, 65%, 60%, 55%, and 50% by weight of the combined non-coated particulates and BCPs, encompassing any value and subset therebetween.

In some embodiments, the viscosified treatment fluids of the present disclosure may further comprise an additive including, but not limited to, the crosslinking agent, a salt, a weighting agent, an inert solid, a fluid loss control agent, an emulsifier, a dispersion aid, a corrosion inhibitor, an emulsion thinner, an emulsion thickener, a viscosifying agent, a surfactant, a foaming agent, a gas, a pH control additive, a biocide, a crosslinker, a stabilizer, a chelating agent, a scale inhibitor, a gas hydrate inhibitor, an oxidizer, a reducer, a friction reducer, a clay stabilizing agent, and any combination thereof In some embodiments, the present disclosure provides a method of introducing a viscosified treatment fluid formed in accordance with the compositions of the present disclosure comprising the BCPs into a subterranean formation. The BCPs in the viscosified treatment fluid may be un-encapsulated or encapsulated, as described herein. The BCPs then form a particulate pack in the subterranean formation. As previously discussed, the particulate pack may be a proppant pack, a gravel pack, or a combination of the two within the subterranean formation. After or before the particulate pack is formed, the breaker may be activated to reduce the viscosity of the viscosified treatment fluid. In those embodiments where the BCP is encapsulated, the encapsulating material may be removed (e.g., degraded, by frangible means, and the like) prior to activating the breaker or after activating the breaker since the encapsulating material will at least partially prevent the breaker from operability, or full operability, until it is exposed by some or full removal of the encapsulating material.

In some embodiments, the components of the viscosified treatment fluids of the present disclosure may be designed such that the gelling agent in the viscosified treatment fluid at least partially contacts the BCPs prior to activating the breaker forming part of the BCP. Upon contact with the BCP or after the passage of a period of time after contact with the BCP, the breaker is activated and not only reduces the viscosity of the viscosified treatment fluid (e.g., by breaking bonds between gelling agents, by breaking crosslinks, and the like), but also substantially removes the gelling agent from contact with the BCP. That is, the activation of the breaker substantially disassociates the gelling agent from the BCP, thus substantially or wholly removing any "residue" of the gelling agent from the BCP, as described previously.

In some embodiments, viscosified treatment fluid may be introduced into the subterranean formation at a rate and pressure sufficient to create or enhance at least one fracture in the subterranean formation. Such pressure may be above the fracture gradient of the particular subterranean formation. As used herein, the term "fracture gradient" refers to the pressure required to induce a fracture in a subterranean formation at a given depth. In such instances, the BCPs of the present disclosure may be placed in the created or enhanced fracture to form a proppant pack. In other embodiments, the subterranean formation in which the viscosified treatment fluids comprising the BCPs are introduced may already have one or more fractures formed therein into which the BCPs are placed to form a proppant pack. In yet other embodiments, a gravel-packing screen may be placed or already in place in the subterranean formation and a gravel pack may be formed using the BCPs from the viscosified treatment fluids, which may also be introduced into the subterranean formation at a rate and pressure sufficient to create or enhance at least one fracture therein and perform a frac-packing operation.

In various embodiments, systems configured for delivering the viscosified treatment fluids comprising the BCPs described herein (referred to below simply as "fluids") described herein to a downhole location are described. In various embodiments, the systems may comprise a pump fluidly coupled to a tubular, the tubular containing the fluids described herein. It will be appreciated that while the system described below may be used for delivering fluids described herein, one or more portions of the fluid may be delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the fluids to a subterranean formation at or above a fracture gradient of the subterranean formation, but it may also be used in cases where fracturing is not desired. In some embodiments, the high pressure pump may be capable of fluidly conveying particulate matter, such as the magnetic proppant particulates or micro-proppant described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the fluids to the high pressure pump. In such embodiments, the low pressure pump may "step up" the pressure of the fluids before reaching the high pressure pump.

In some embodiments, the systems described herein can further comprise a mixing tank that is upstream of the pump and in which the fluids are formulated. In various embodiments, the pump (e.g., a low pressure pump, a high pressure pump, or a combination thereof) may convey the fluids from the mixing tank or other source of the fluids to the tubular. In other embodiments, however, the fluids may be formulated offsite and transported to a worksite, in which case the fluid may be introduced to the tubular via the pump directly from its shipping container (e.g., a truck, a railcar, a barge, or the like) or from a transport pipeline. In either case, the fluids may be drawn into the pump, elevated to an appropriate pressure, and then introduced into the tubular for delivery downhole.

FIG. 1 shows an illustrative schematic of a system that can deliver the fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the fluids of the embodiments herein may be formulated. The fluids may be conveyed via line 12 to wellhead 14, where the fluids enter tubular 16, tubular 16 extending from wellhead 14 into subterranean formation 18. Upon being ejected from tubular 16, the fluids may subsequently penetrate into subterranean formation 18. Pump 20 may be configured to raise the pressure of the fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the fluid may, in some embodiments, flow back to wellhead 14 and exit subterranean formation 18. In some embodiments, the fluid that has flowed back to wellhead 14 may subsequently be recovered and recirculated to subterranean formation 18.

It is also to be recognized that the disclosed fluids may also directly or indirectly affect the various downhole equipment and tools that may come into contact with the fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

Embodiment A: A method comprising: preparing a viscosified treatment fluid comprising a base fluid, a gelling agent, and breaker coated particulates ("BCPs"), wherein the BCPs comprise particulates at least partially coated with a first layer of a stabilization agent followed by a second layer of a breaker, and wherein the stabilization agent is present in the range of about 0.1% to about 5% v/w % of the particulates; introducing the viscosified treatment fluid into a subterranean formation; activating the breaker to reduce a viscosity of the viscosified treatment fluid; and forming a particulate pack in the subterranean formation with the BCPs.

Embodiment A may have one or more of the following additional elements in any combination:

Element A1: Wherein the gelling agent in the viscosified treatment fluid at least partially contacts the BCPs prior to activating the breaker, and wherein activating the breaker substantially removes the gelling agent from contact with the BCPs.

Element A2: Wherein the breaker is an oxidative breaker, an acid breaker, a delayed release acid breaker, a delayed release enzyme breaker, a temperature activated breaker, a hydrolysable ester breaker, any encapsulated in an encapsulating material, and any combination thereof.

Element A3: Wherein the stabilization agent is selected from the group consisting of an aqueous tackifying agent, a non-aqueous tackifying agent, a silyl-modified polyamide compound, and any combination thereof.

Element A4: Wherein the viscosified treatment fluid further comprises a free-floating breaker.

Element A5: Wherein the particulate pack is selected from the group consisting of a proppant pack, a gravel pack, and any combination thereof.

Element A6: Wherein the viscosified treatment fluid is introduced into the subterranean formation at a rate and pressure sufficient to create or enhance a fracture therein, and wherein the particulate pack is formed in the fracture.

Element A7: Further comprising a wellhead with a tubular extending therefrom and into a subterranean formation; and a pump fluidly coupled to the tubular, the tubular comprising the viscosified treatment fluid.

By way of non-limiting example, exemplary combinations applicable to A include: A with A1 and A2; A with A1 and A3; A with A1 and A4; A with A1 and A5; A with A1 and A5; A with A1 and A6; A with A1 and A7; A with A2 and A3; A with A2 and A4; A with A2 and A5; A with A2 and A6; A with A2 and A7; A with A3 and A4; A with A3 and A5; A with A3 and A6; A with A3 and A7; A with A4 and A5; A with A4 and A6; A with A4 and A7; A with A5 and A6; A with A5 and A7; A with A6 and A7; A with A1, A2, A3, A4, A5, A6, and A7; A with A1, A4, A5, and A7; A with A1, A4, and A6; A with A2, A5, A6, and A7.

Embodiment B: A method comprising: preparing a viscosified treatment fluid comprising a base fluid, a gelling agent, and breaker coated particulates ("BCPs") encapsulated in an encapsulating material, wherein the BCPs comprise particulates at least partially coated with a first layer of a stabilization agent followed by a second layer of a breaker, and wherein the stabilization agent is present in the range of about 0.1% to about 5% v/w % of the particulates; introducing the viscosified treatment fluid into a subterranean formation; removing the encapsulating material; and activating the breaker to reduce a viscosity of the viscosified treatment fluid; and forming a particulate pack in the subterranean formation with the BCPs.

Embodiment B may have one or more of the following additional elements in any combination:

Element B1: Wherein the gelling agent in the viscosified treatment fluid at least partially contacts the BCPs prior to activating the breaker, and wherein activating the breaker substantially removes the gelling agent from contact with the BCPs.

Element B2: Wherein the breaker is an oxidative breaker, an acid breaker, a delayed release acid breaker, a delayed release enzyme breaker, a temperature activated breaker, a hydrolysable ester breaker, any encapsulated in an encapsulating material, and any combination thereof.

Element B3: Wherein the stabilization agent is selected from the group consisting of an aqueous tackifying agent, a non-aqueous tackifying agent, a silyl-modified polyamide compound, and any combination thereof.

Element B4: Wherein the encapsulating material is selected from the group consisting of a corn starch, a wheat starch, a potato starch, a barley starch, a bean starch, a cassava starch, a ground rice, a ground corn, a ground wheat, a ground bean, a ground guar gum, a cellulose, a cellulose derivative, a polyacrylate, a polymethacrylate, a polyacrylamide, a polyvinylpyrrolidone, a polylactic acid, an ethylene propylene diene monomer rubber, a polyvinylidene chloride, a nylon, a wax, a polyurethane, a cross-linked partially hydrolyzed acrylic, a shellac, a calcium sulfate, a calcium chloride, a cementitious material, a salt, barium sulfate, benzoic acid, polyvinyl alcohol, sodium carbonate, sodium bicarbonate, calcium oxide, a degradable polymer, a polyglycolide, a poly(ε-caprolactone), a poly(hydroxybutyrate), a poly(anhydride), an aliphatic polycarbonate, a polyorthoester, a poly(amino acid), a poly(ethylene oxide), a poly(phosphazene), and any combination thereof.

Element B5: Wherein the viscosified treatment fluid further comprises a free-floating breaker.

Element B6: Wherein the viscosified treatment fluid is introduced into the subterranean formation at a rate and pressure sufficient to create or enhance a fracture therein, and wherein the particulate pack is formed in the fracture.

Element B7: Wherein the BCPs encapsulated in an encapsulating material are stored in dry-form prior to the step of: preparing a viscosified treatment fluid.

Element B8: further comprising a wellhead with a tubular extending therefrom and into a subterranean formation; and a pump fluidly coupled to the tubular, the tubular comprising the viscosified treatment fluid.

By way of non-limiting example, exemplary combinations applicable to B include: B with B1 and B2; B with B1 and B3; B with B1 and B4; B with B1 and B5; B with B1 and B5; B with B1 and B6; B with B1 and B7; B with B1 and B8; B with B2 and B3; B with B2 and B4; B with B2 and B5; B with B2 and B6; B with B2 and B7; B with B2 and B8; B with B3 and B4; B with B3 and B5; B with B3 and B6; B with B3 and B7; B with B3 and B8; B with B4 and B5; B with B4 and B6; B with B4 and B7; B with B4 and B8; B with B5 and B6; B with B5 and B7; B with B5 and B8; B with B6 and B7; B with B6 and B8; B with B7 and B8; B with B1, B2, B3, B4, B5, B6, and B7; B with B1, B4, B5, and B7; B with B1, B4, and B6; B with B2, B5, B6, and B7; B with B1, B2, B3, B4, B5, B6, B7, and B8; B with B3, B5, and B8; B with B2, B6, B7, and B8.

Embodiment C: A viscosified treatment fluid comprising: a base fluid, a gelling agent, and breaker coated particulates ("BCPs"), wherein the BCPs comprise particulates at least partially coated with a first layer of a stabilization agent followed by a second layer of a breaker, and wherein the stabilization agent is present in the range of about 0.1% to about 5% v/w % of the particulates.

Embodiment C may have one or more of the following additional elements in any combination:

Element C1: Wherein the breaker is an oxidative breaker, an acid breaker, a delayed release acid breaker, a delayed release enzyme breaker, a temperature activated breaker, a hydrolysable ester breaker, any encapsulated in an encapsulating material, and any combination thereof.

Element C2: Wherein the stabilization agent is selected from the group consisting of an aqueous tackifying agent, a non-aqueous tackifying agent, a silyl-modified polyamide compound, and any combination thereof.

Element C3: Wherein the viscosified treatment fluid further comprises a free-floating breaker.

Element C4: Where the breaker coated particulates are encapsulated in an encapsulating material.

Element C5: Where the breaker coated particulates are encapsulated in an encapsulating material selected from the group consisting of a corn starch, a wheat starch, a potato starch, a barley starch, a bean starch, a cassava starch, a ground rice, a ground corn, a ground wheat, a ground bean, a ground guar gum, a cellulose, a cellulose derivative, a polyacrylate, a polymethacrylate, a polyacrylamide, a polyvinylpyrrolidone, a polylactic acid, an ethylene propylene diene monomer rubber, a polyvinylidene chloride, a nylon, a wax, a polyurethane, a cross-linked partially hydrolyzed acrylic, a shellac, a calcium sulfate, a calcium chloride, a cementitious material, a salt, barium sulfate, benzoic acid, polyvinyl alcohol, sodium carbonate, sodium bicarbonate, calcium oxide, a degradable polymer, a polyglycolide, a poly($\varepsilon$-caprolactone), a poly(hydroxybutyrate), a poly(anhydride), an aliphatic polycarbonate, a polyorthoester, a poly(amino acid), a poly(ethylene oxide), a poly(phosphazene), and any combination thereof.

Element C6: Further comprising non-coated particulates, wherein the BCPs are present in an amount in the range of from about 5% to about 95% of the combined weight of the non-coated particulates and the BCPs.

By way of non-limiting example, exemplary combinations applicable to C include: C with C1 and C2; C with C1 and C3; C with C1 and C4; C with C1 and C5; C with C1 and C5; C with C1 and C6; C with C2 and C3; C with C2 and C4; C with C2 and C5; C with C2 and C6; C with C3 and C4; C with C3 and C5; C with C3 and C6; C with C4 and C5; C with C4 and C6; C with C5 and C6; C with C1, C2, C3, C4, C5, and C6; C with C1, C4, C5, and C6; C with C1, C4, and C5; C with C2, C3, C5, and C6; C with C3, C5, and C6; C with C2, C3, and C4.

To facilitate a better understanding of the embodiments of the present invention, the following example of an embodiment of the present disclosure is provided. In no way should the following examples be read to limit, or to define, the scope of the present disclosure.

EXAMPLE

In this example, the ability of the BCPs formed according to the embodiments described herein to break a viscous treatment fluid was evaluated. A sample fluid was prepared by first preparing BCPs by dry coating 47.9 grams of 20/40 Ottawa sand particulates with 0.47 ml of SANDWEDGE® NT stabilization agent; the sand and stabilization agent were mixed with a spatula for about 20-40 seconds to ensure uniform coating. Thereafter, 3 gallons/1000 gallons of VICON NF™ breaker was added to the stabilization agent coated sand, and mixed with a spatula for about 20-40 seconds, to form the BCPs. A 30 pound/1000 gallon viscosified treatment fluid (pH 9.6) was prepared using fresh water base fluid, guar gum gelling agent, and 4 pound/gallon of the BCPs. In addition, a borate crosslinking agent was added to the viscosified treatment fluid in an amount of 2 gallons/1000 gallons while stirring. The sample was maintained in a water bath at 93.3° C. (200° F.) for 24 hours.

A control fluid (pH 9.6) was prepared using fresh water base fluid, 30 pounds/1000 gallons of guar gum gelling agent, 4 pound/gallon of 20/40 Ottawa sand particulates, and 3 gallons/1000 gallons of VICON NF™ BREAKER. The control fluid was maintained in a water bath at 93.3° C. (200° F.) for 24 hours.

After the 24 hour period in the water bath, the sample fluid and control fluid were visually compared and both systems showed that the crosslinked viscosified fluids were able to be broken, without any impairment of the breaking of the fluid when the breaker was coated onto the sand particulates (forming the BCPs). Without being bound by theory, it is expected that as the breaker concentration is decreased, the BCPs described herein will allow greater removal of gelling agent residue from the particulates than would be observed in the control sample.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
preparing a viscosified treatment fluid comprising a base fluid, a gelling agent, and breaker coated particulates (BCPs),
wherein the BCPs comprise particulates at least partially coated with a first layer of a stabilization agent followed by a second layer of a breaker, wherein the second layer of the breaker forms a chemical bond with the first layer of the stabilization agent, and
wherein the stabilization agent is present in the range of about 0.1% to about 5% v/w % of the particulates;
introducing the viscosified treatment fluid into a subterranean formation;
activating the breaker to reduce a viscosity of the viscosified treatment fluid; and
forming a particulate pack in the subterranean formation with the BCPs.

2. The method of claim 1, wherein the gelling agent in the viscosified treatment fluid at least partially contacts the BCPs prior to activating the breaker, and wherein activating the breaker substantially removes the gelling agent from contact with the BCPs.

3. The method of claim 1, wherein the breaker comprises at least one breaker selected from the group consisting of an oxidative breaker, an acid breaker, a delayed release acid breaker, a delayed release enzyme breaker, a temperature activated breaker, a hydrolysable ester breaker, and any combination thereof.

4. The method of claim 1, wherein the stabilization agent is selected from the group consisting of an aqueous tackifying agent, a non-aqueous tackifying agent, a silyl-modified polyamide compound, and any combination thereof.

5. The method of claim 1, wherein the viscosified treatment fluid further comprises a free-floating breaker.

6. The method of claim 1, wherein the particulate pack is selected from the group consisting of a proppant pack, a gravel pack, and any combination thereof.

7. The method of claim 1, wherein the viscosified treatment fluid is introduced into the subterranean formation at a rate and pressure sufficient to create or enhance a fracture therein, and wherein the particulate pack is formed in the fracture.

8. The method of claim 1, further comprising a wellhead with a tubular extending therefrom and into a subterranean formation; and
a pump fluidly coupled to the tubular, the tubular comprising the viscosified treatment fluid.

9. A method comprising:
preparing a viscosified treatment fluid comprising a base fluid, a gelling agent, and breaker coated particulates (BCPs) encapsulated in an encapsulating material,
wherein the BCPs comprise particulates at least partially coated with a first layer of a stabilization agent followed by a second layer of a breaker, wherein the second layer of the breaker forms a chemical bond with the first layer of the stabilization agent, and
wherein the stabilization agent is present in the range of about 0.1% to about 5% v/w % of the particulates;
introducing the viscosified treatment fluid into a subterranean formation;
removing the encapsulating material;
activating the breaker to reduce a viscosity of the viscosified treatment fluid; and
forming a particulate pack in the subterranean formation with the BCPs.

10. The method of claim 9, wherein the gelling agent in the viscosified treatment fluid at least partially contacts the BCPs prior to activating the breaker, and wherein activating the breaker substantially removes the gelling agent from contact with the BCPs.

11. The method of claim 9, wherein the breaker comprises at least one breaker selected from the group consisting of an oxidative breaker, an acid breaker, a delayed release acid breaker, a delayed release enzyme breaker, a temperature activated breaker, a hydrolysable ester breaker, and any combination thereof.

12. The method of claim 9, wherein the stabilization agent is selected from the group consisting of an aqueous tackifying agent, a non-aqueous tackifying agent, a silyl-modified polyamide compound, and any combination thereof.

13. The method of claim 9, wherein the encapsulating material is selected from the group consisting of a corn starch, a wheat starch, a potato starch, a barley starch, a bean starch, a cassava starch, a ground rice, a ground corn, a ground wheat, a ground bean, a ground guar gum, a cellulose, a cellulose derivative, a polyacrylate, a polymethacrylate, a polyacrylamide, a polyvinylpyrrolidone, a polylactic acid, an ethylene propylene diene monomer rubber, a polyvinylidene chloride, a nylon, a wax, a polyurethane, a cross-linked partially hydrolyzed acrylic, a shellac, a calcium sulfate, a calcium chloride, a cementitious material, a salt, barium sulfate, benzoic acid, polyvinyl alcohol, sodium carbonate, sodium bicarbonate, calcium oxide, a degradable polymer, a polyglycolide, a poly($\varepsilon$-caprolactone), a poly(hydroxybutyrate), a poly(anhydride), an aliphatic polycarbonate, a polyorthoester, a poly(amino acid), a poly(ethylene oxide), a poly(phosphazene), and any combination thereof.

14. The method of claim 9, wherein the viscosified treatment fluid further comprises a free-floating breaker.

15. The method of claim 9, wherein the viscosified treatment fluid is introduced into the subterranean formation at a rate and pressure sufficient to create or enhance a fracture therein, and wherein the particulate pack is formed in the fracture.

16. The method of claim 9, wherein the BCPs encapsulated in an encapsulating material are stored in dry-form prior to the step of: preparing a viscosified treatment fluid.

17. The method of claim 9, further comprising a wellhead with a tubular extending therefrom and into a subterranean formation; and
a pump fluidly coupled to the tubular, the tubular comprising the viscosified treatment fluid.

18. A viscosified treatment fluid comprising:
a base fluid,
a gelling agent, and
breaker coated particulates (BCPs),
wherein the BCPs comprise particulates at least partially coated with a first layer of a stabilization agent followed by a second layer of a breaker, wherein the second layer of the breaker forms a chemical bond with the first layer of the stabilization agent, and wherein the stabilization agent is present in the range of about 0.1% to about 5% v/w % of the particulates.

19. The treatment fluid of claim 18, where the breaker coated particulates are encapsulated in an encapsulating material.

20. The treatment fluid of claim 18, further comprising non-coated particulates, wherein the BCPs are present in an amount in the range of from about 5% to about 95% of the combined weight of the non-coated particulates and the BCPs.

\* \* \* \* \*